Figure 1:
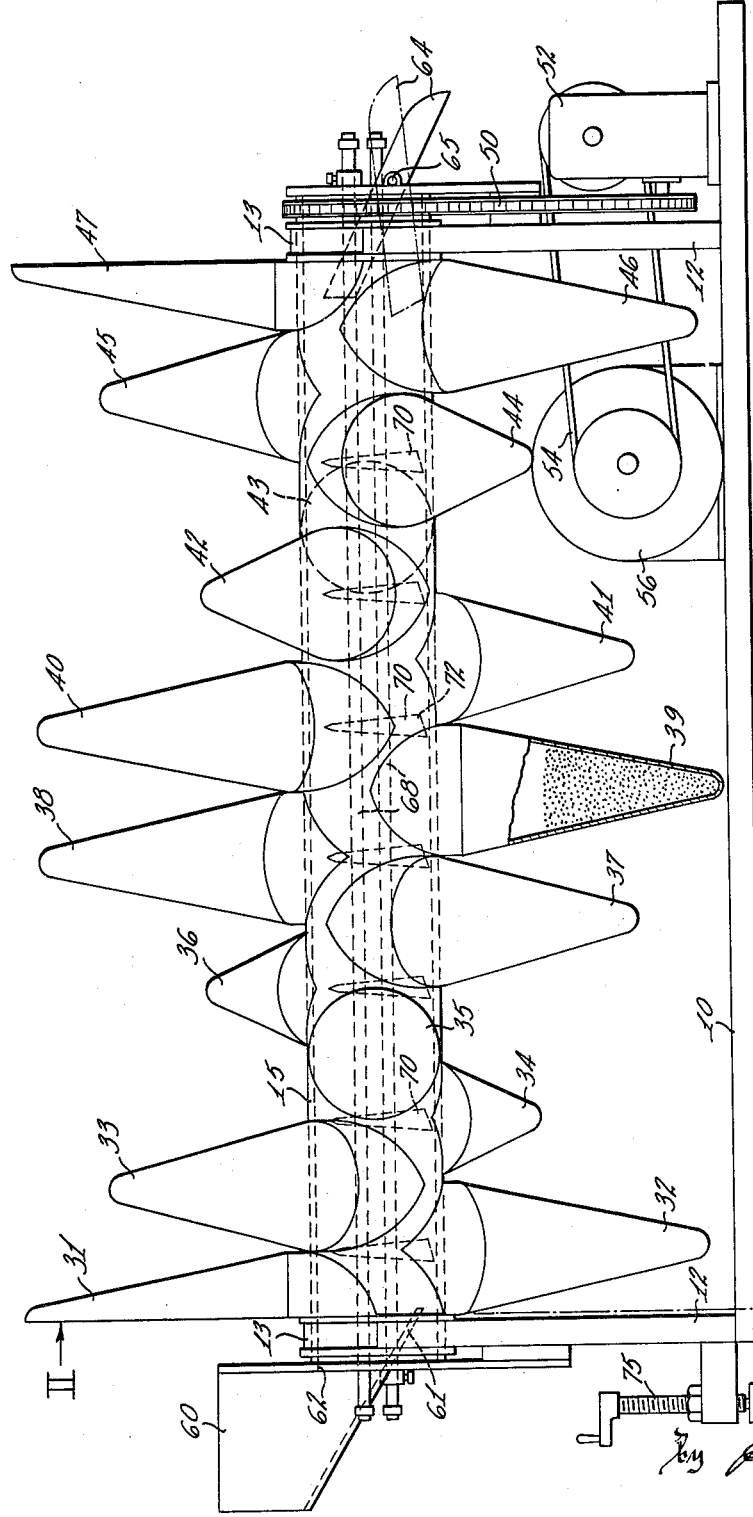

June 23, 1964 M. C. RAETHER 3,138,367
CONTINUOUS OR BATCH BLENDER
Filed Oct. 1, 1962 2 Sheets-Sheet 2

Inventor
Marvin C. Raether
by Eugene H. Simpson
Attorney

United States Patent Office 3,138,367
Patented June 23, 1964

3,138,367
CONTINUOUS OR BATCH BLENDER
Marvin C. Raether, Brookfield, Wis., assignor to Allis-Chalmers Manufacturing Company, Milwaukee, Wis.
Filed Oct. 1, 1962, Ser. No. 227,506
4 Claims. (Cl. 259—3)

This invention relates to blenders and more particularly to a machine adapted to blend materials either in batch lots or as a continuous operation.

It is an object of the present invention to provide a blender which may be used to blend material either in batches or as a continuous operation.

A further object of the invention is to provide a blender which will result in even distribution of material throughout the blender.

It is a further object of the invention to provide a blender which will discharge a continuous supply of a uniformly blended mixture.

Another object of the invention is to provide a blender which will blend a batch of material and divide the blend into a plurality of equal portions.

A further object of the invention is to provide a blender which will reduce the stress on the bearings during operation.

A still further object is to provide a blender in which power consumption will remain substantially uniform throughout the cycle.

A still further object is to provide a blender which is rapid and smooth in operation.

A still further object is to provide a rotary blender having adequate mechanical strength.

Still further objects will become apparent upon considering the following specification which when considered in conjunction with the accompanying drawings illustrates a preferred form of the invention.

Figure 2:
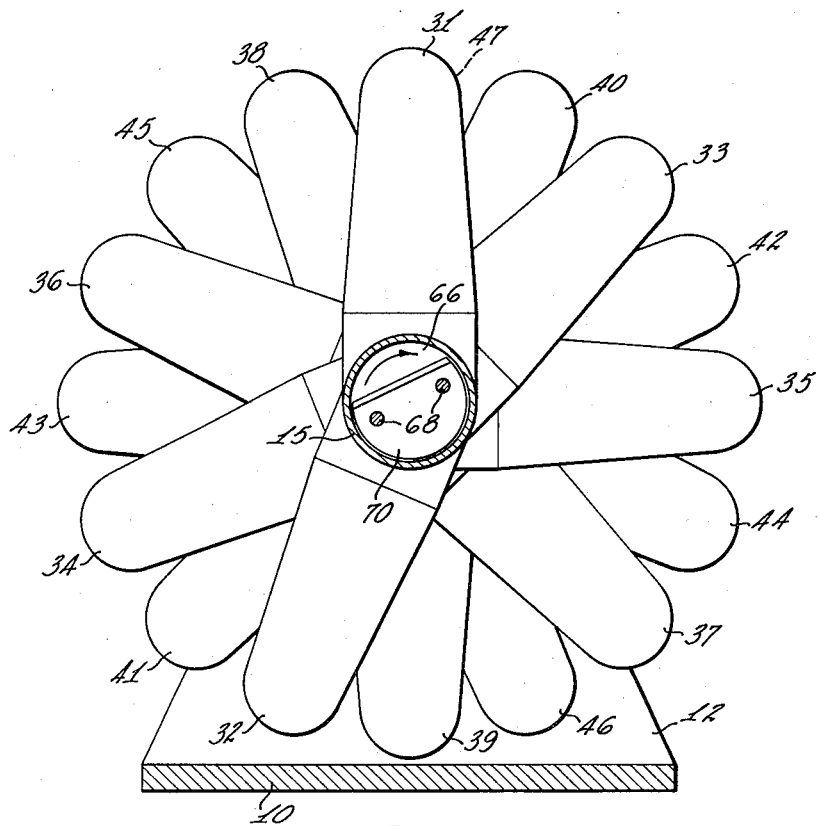

In the drawings:

FIG. 1 is a side elevational view of a blender embodying the principles of the present invention; and FIG. 2 is a transverse cross section taken along line II—II of FIG. 1, looking in the direction of the arrows.

Referring to the drawings, the blender is built on a base 10 which carries a pair of spaced parallel pedestals 12, 12. The pedestals are formed with bearings 13, 13 at their upper ends which carry a cylindrical tubular body 15 mounted for rotation therein.

The body 15 has a plurality of apertures cut therethrough which receive a plurality of blending cones 31, 33, 35, 37, 39, 41, 43, 45, 47 which are arranged in a helix about the body, the cone 31 being a half cone to receive the unblended material and the cone 47 being a half cone to discharge the blended material.

A second series of cones 32, 34, 36, 38, 40, 42, 44 and 46 are formed about the body and open into apertures therethrough on a second helix having a pitch equal to the first helix but offset therefrom.

The cones on each helix are spaced angularly at 45 degrees about the helix, with the cones on the two helices being spaced midway between the cones on the opposite helix.

If desired, in order to arrange the blending cones on the body 15, the cross sections of the cones may be made elliptical, which enables the cones to be spaced together at closer intervals on the body 15, while producing a stronger body member than would otherwise be possible.

In order to provide a shorter radius of swing of the cones as they are rotated by the rotation of the body member 15, the cones are made truncated which not only shortens the radius of swing of the cones but also provides less opportunity for the material to become lodged in a sharp cone point.

The body 15, with the cones thereon, is mounted to rotate in the bearings 13 and is driven by a chain 50 carried between a sprocket on the body member 15 and a sprocket on a worm gear reduction 52. The worm gear reduction 52 is driven by a V-belt 54 or other suitable means from an electric motor 56 mounted on the base 10.

It will be noted from FIG. 1 that the axes of all of the cones intersect the axis of the cylindrical tubular body member 15 and that the axis of each cone intersects the axis of the body 15 at a point substantially midway between the points of intersection of the axes of two cones on the opposite helix and that each cone formed on the first spiral overlies one-half of each of two cones formed on the opposite spiral, resulting, as the body 15 rotates, and as each cone approaches its upper vertex, that material from that cone empties into two cones formed on the opposite helix. The material is thus blended by repeated flow between cones as well as by repeated divisions of the material between a rearward cone and a forward cone.

Material is fed into the machine through a feed hopper 60. The hopper 60 receives the unblended material and delivers the material by means of a chute 61 through an opening 62 in the hopper into either the receiving cone 31 or the mixing cone 32 depending upon the position of the cones relative to the feed hopper 60.

The material thus delivered to the machine passes through the blender in a manner to be described below and is delivered alternately from the cones 46 and 47 into a discharge chute 64. The chute 64 is mounted on a pivot 65 and may be adjusted from the discharge position shown in FIG. 1, used when the apparatus is operated as a continuous blender, to a "hold" position, shown dotted in FIG. 1, when the apparatus is being used to mix a single batch.

The end pieces 66, FIG. 2 (nonrotatable), form closure members for the body 15 and carry a pair of rods 68, 68 which are slidably mounted between the end pieces 66 and carry a plurality of substantially sector shaped dividers 70 fixed to the rods. The sectors 70 are each wedge shaped in cross section and are formed with the trailing edge relieved, as shown at 72, to enable the sectors to be moved axially with the rods without obstruction from the material being blended.

*Operation*

In operation, the machine is started by starting a motor 56 which operates the worm gear reduction member 52 to drive the chain 50 which in turn drives the tubular body member 15. Rotation of the tubular body member 15 rotates the mixing chambers or cones 31–47 about the axis of the tubular member in the following manner.

Elements constituting the ingredients of the mixture are fed into the hopper 60 in proportion to their total ratio in the finished product and delivered through the chute 61 and the end plate 66 and into either the receiving cone 31 or the first mixing cone 32.

As the mixing cones approach their upper position, any material carried by the cone 31 will discharge the material into the chamber 32 at which time additional material from the hopper flows into the cone 32. As the cone 32 approaches its zenith, material carried thereby is delivered to both the cones 31 and 33. As the body rotates further and the cones 31 and 33 approach their zenith, the cone 31 first discharges its material forwardly into the cone 32, forming a layer at the bottom of that cone. Subsequently, the cone 33 reaches its zenith and deposits half of its material on top of the material already in the cone 32, thus forming two horizontal strata in the cone 32, and the other half of its material moves forwardly into the bottom of cone 34. As the cone 34 approaches its zenith, the cone 31 has again dropped its material in the bottom of cone 32 followed by the cone 33 which has dropped half of its material above the material in cone 32 and half of its material on the bottom of cone 34, and when the cone 34 reaches its zenith, it deposits half of its material above the material already in cone 34 and half of its material forwardly into the bottom of cone 35.

This method of blending continues throughout the length of the blender, each blending cone on each helix flowing its material into both the trailing cone and the leading cone on the opposite helix to form two horizontal strata.

The blended material is discharged from the forward end of the body 15 on the chute 64.

The adjustable dividers 70 are provided within the body to vary the rate of flow of material through the blender. By moving the dividers toward the intake of the machine, a greater portion of the material being blended enters the forward chamber on each revolution and a smaller portion enters each trailing cone, thus accelerating the flow of material through the blender.

In order to obtain more rapid movement of the material through the machine, an adjustable screw footing 75 may be employed in order to speed the discharge of the material from the machine. The base of the machine may be turned upwardly by means of the screw footing 75 causing a still greater proportion of the material to move forward on each rotation of the machine.

Having thus described the invention, it will be realized that the drawings show merely a preferred embodiment thereof, and that various changes in size, shape and arrangement of parts may be employed without departing from the spirit of the invention or the scope of the subjoined claims.

That which is claimed as new and is desired to be secured by United States Letters Patent is:

1. In a blender of the character described, a feed hopper adapted to receive unblended material, a tubular body member receiving the unblended material from said hopper, a plurality of blending cones opening into said body on two parallel helices of equal pitch, said blending cones being spaced on said helices so that the axis of each blending cone on one helix intersects the axis of the tubular body between the axes of two blending cones on the other helix, means to rotate said tubular body to blend material, whereby material in each cone is delivered to two cones arranged on the opposite helix and on opposite sides thereof, and means to deliver the blended material from the blender to a desired point.

2. In a blender of the character described, a feed hopper adapted to receive unblended material, a tubular body member receiving the unblended material from said hopper, a plurality of blending cones opening into said body on a pair of helices of equal pitch, said blending cones being spaced on said helices so that the axis of each blending cone intersects the axis of the tubular body between the axes of two blending cones on the opposite helix, means to rotate the tubular body to blend material, whereby material in each cone is delivered to two cones arranged on the opposite helix and on opposite sides thereof, a divider adapted to vary the percentages of material delivered to the cones, and means to deliver the blended material from the blender to a desired point.

3. In a blender of the character described, a feed hopper adapted to receive unblended material, a tubular body member receiving the unblended material from said hopper, a plurality of blending cones opening into said body on a pair of helices of equal pitch, said blending cones being spaced on said helices so that the axis of each blending cone intersects the axis of the tubular body between the axes of two blending cones on the opposite helix, whereby material in each cone is delivered to two cones arranged on the opposite helix and on opposite sides thereof, a divider adjustably mounted on the axis of said body member adapted to vary the percentages of material delivered to the cones, and means to deliver the blended material from the blender to a desired point.

4. In a blender of the character described, a feed hopper adapted to receive unblended material, a tubular body member receiving the unblended material from said hopper, a plurality of blending cones opening into said body on two parallel helices of equal pitch, said blending cones being spaced on said helices so that the axis of each blending cone on one helix intersects the axis of the tubular body between the axes of two blending cones on the other helix, means to rotate the tubular body at a constant speed, whereby material in each cone is delivered to two cones arranged on the opposite helix and on opposite sides thereof, means independent of said last named means to vary the velocity of travel of the material through said blender, and means to deliver the blended material from the blender to a desired point.

References Cited in the file of this patent

UNITED STATES PATENTS

| | | |
|---|---|---|
| 2,297,804 | Siegfried | Oct. 6, 1942 |
| 2,797,070 | Winn et al. | June 25, 1957 |